United States Patent [19]

Montgomery

[11] Patent Number: 4,705,078

[45] Date of Patent: Nov. 10, 1987

[54] PIPE REPAIR CLAMP

[76] Inventor: Ronald S. Montgomery, 1308 Cherry St., Gainesville, Tex. 76240

[21] Appl. No.: 778,363

[22] Filed: Sep. 20, 1985

[51] Int. Cl.$^4$ ............................................. F16L 55/16
[52] U.S. Cl. ...................................... 138/99; 138/97; 24/279
[58] Field of Search ........................... 138/97, 99, 103; 24/279; 285/197

[56] References Cited

U.S. PATENT DOCUMENTS

| 40,948 | 12/1863 | Rymes | 138/99 |
|---|---|---|---|
| 42,735 | 5/1864 | Rubsam | 138/99 |
| 1,146,813 | 7/1915 | Petermon et al. | 24/279 |
| 2,222,289 | 11/1940 | Fordon | 138/99 x |
| 2,227,551 | 1/1941 | Morris | 138/99 X |
| 2,611,631 | 9/1952 | Benson | 285/197 |
| 2,776,153 | 1/1957 | Smith | 138/99 X |
| 3,487,856 | 1/1970 | Turner et al. | 138/99 |
| 3,779,272 | 12/1973 | Dunmire | 285/197 |
| 3,944,265 | 3/1976 | Hiemstra et al. | 24/279 X |
| 4,364,588 | 12/1982 | Thomspon | 138/99 |
| 4,365,393 | 12/1982 | Hauffe et al. | 138/99 |

FOREIGN PATENT DOCUMENTS 7782 of 1909 United Kingdom ................. 138/99

Primary Examiner—James E. Bryant, III
Attorney, Agent, or Firm—Hubbard, Thurman, Turner & Tucker

[57] ABSTRACT

A clamp for repairing a pipe. The clamp includes a flexible metal band having adjacent one of its ends a plurality of lengthwise spaced apart holes. The flexible metal band is held about the pipe by a pair of lugs, including a first lug fixed to the end of the metal band opposite the end with the holes. A second lug is positionable adjacent the end of the metal band with the holes. A bolt is provided for passing through a selected one of the holes to join and draw together the lugs. A tab is provided between the first lug and the metal band to urge the metal band into clamping engagement with the second lug. An elastomeric gasket sheet is attached to the metal band at its central portion and includes two free ends. The gasket sheet is long enough to encircle the pipe with one of its free ends overlapping the other. The overlapping free end includes a metal strip which underlies the lugs.

10 Claims, 7 Drawing Figures

PIPE REPAIR CLAMP

BACKGROUND OF THE INVENTION

A. Field of the Invention

The present invention relates generally to pipe repair clamps and more particularly to a single pipe repair clamp that is adapted to repair pipes of varying diameters.

B. Description of the Prior Art

The use of pipe repair clamps to repair breaks or leaks in pipes is well known. A typical clamp includes a gasket strip which is wrapped around the pipe over the broken or leaking area and a flexible band that is in turn wrapped around the gasket sheet. The bank is normally held together by a pair of lugs attached to the ends of the band and held together by bolts or the like. Typically, a metal strip is attached to one of the ends of the gasket sheet and is positioned to underlie the lugs. Examples of pipe repair clamps of the foregoing type are disclosed in any one of the following patents: Hauffe U.S. Pat. No. 4,409,708; Daghe, et al. U.S. Pat. No. 4,381,020; Dunmire U.S. Pat. No. 3,914,833; Hoke U.S. Pat. No. 2,897,568; and Halterman U.S. Pat. No. 3,173,450.

The devices of the foregoing enumerated patents are adapted for use in repairing pipes of a single diameter. A pipe break or leak is in most cases an emergency situation which requires immediate repair. Accordingly, pipe repair facilities must stock repair clamps rather than order them when needed. Since most piping systems include pipes of varying diameter and type, it is necessary for pipe repair facilities to stock a large number of repair clamps adapted for various diameter pipes. The cost of maintaining such inventories is substantial.

It is therefore an object of the present invention to provide a single pipe repair clamp that is adaptable to repair breaks or leaks in pipes over a large range of diameters.

SUMMARY OF THE INVENTION

Briefly stated, the foregoing and other objects are satisfied by the pipe repair clamp of the present invention. The pipe repair clamp of the present invention includes a flexible metal band with a length between its ends sufficient to encircle a range of pipe diameters. The metal band includes a plurality of holes spaced apart lengthwise adjacent one of its ends. A first lug is connected to the other end of the band. A second lug, which is not connected to the band, is positionable next to the band adjacent one of the holes. A bolt passes through one of the holes and draws together the first and second lugs about the pipes. The second lug is thus positionable at various points along the length of the metal band at various holes, thereby to accommodate varying diameter pipes. A tab is disposed between the first lug and the metal band for urging the metal band into contact with the second lug when the first and second lugs are drawn together.

An elastomeric gasket sheet is attached at its central portion to the metal band. The gasket sheet has two free ends and a length sufficient to encircle a range of pipe diameters with one of the free ends overlapping the other. A metal strip is attached to the outside surface of one of the free ends of the gasket sheet to underlie the lugs when the metal band is wrapped about the pipe.

DESCRIPTION OF THE PREFERRED EMBODIMENT

Figure 1:
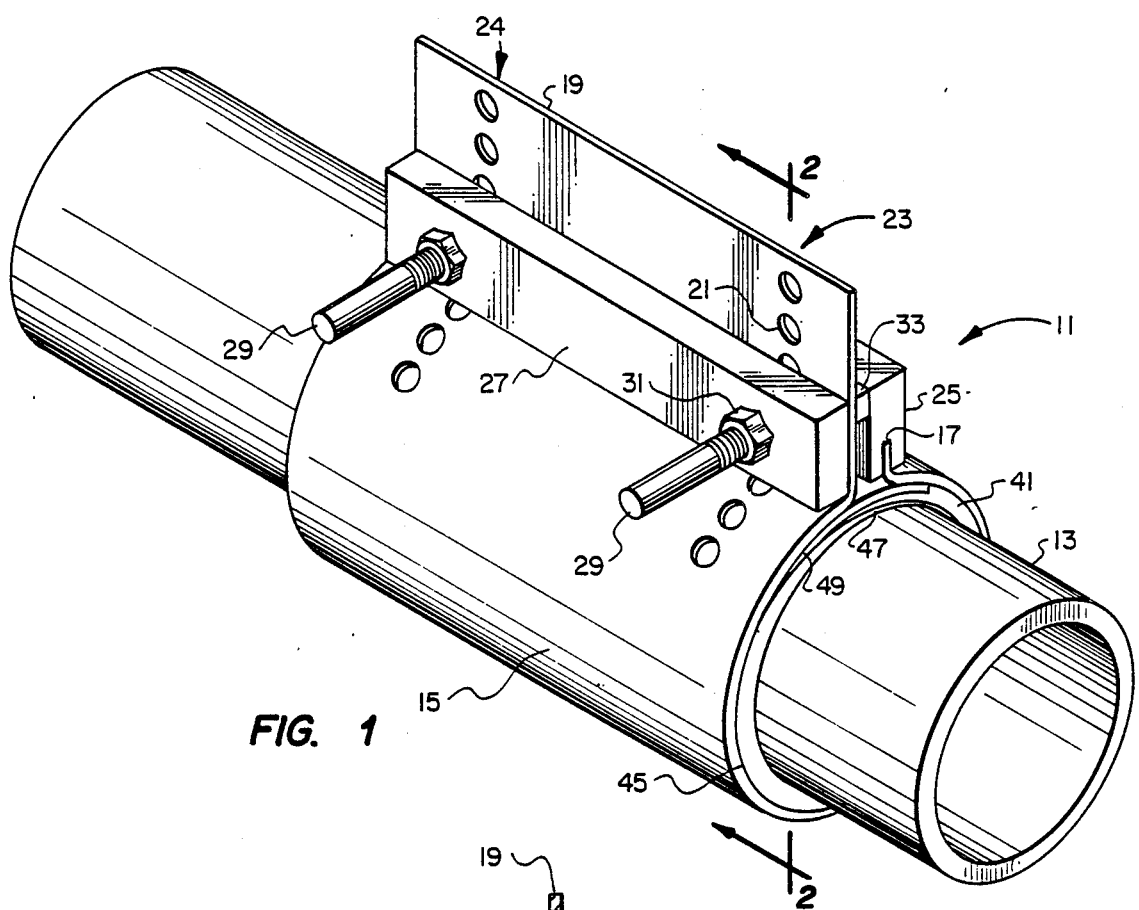
FIG. 1 is a perspective view of the preferred embodiment of the pipe repair clamp of the present invention positioned about a pipe.
Figure 2:
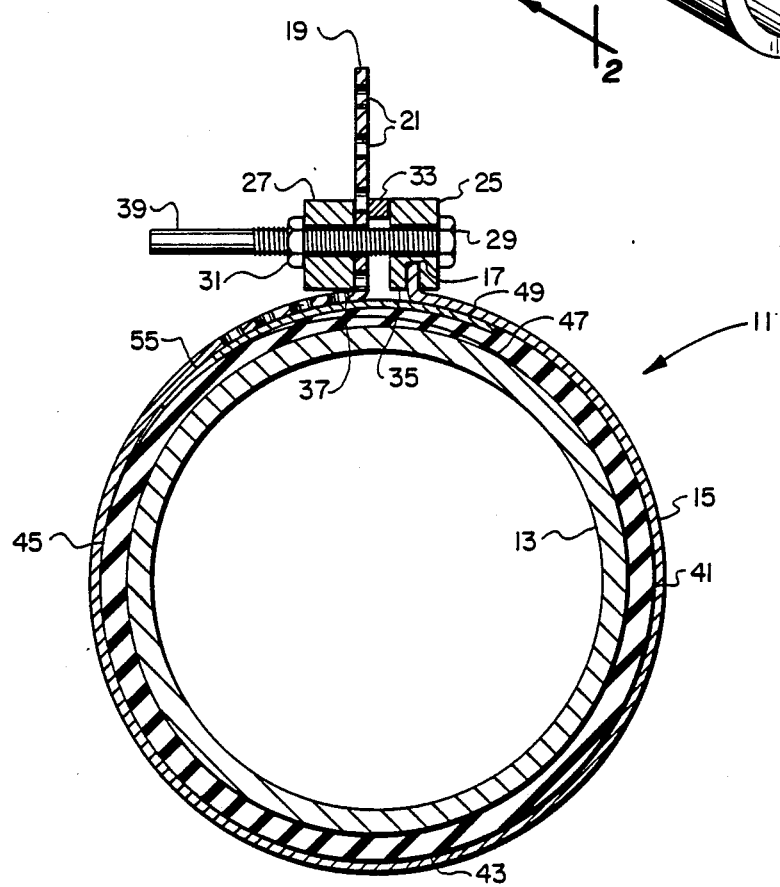
FIG. 2 is a sectional view taken alone line 2—2 of FIG. 1.

Referring now to the drawings, and first to FIGS. 1 and 2, the pipe repair clamp of the present invention is designated generally by the numeral 11. Pipe repair clamp 11 is adapted for repairing a leak or break in a pipe 13.

Pipe repair clamp 11 includes a flexible metal band 15, which has a first end 17 and a second end 19. The length of metal band 15 between ends 17 and 19 is sufficient to encircle pipe 13 and is preferably longer than the outside diameter of the largest diameter pipe for which it is contemplated to use pipe repair clamp 11. Metal band 15 includes a plurality of lengthwise spaced apart holes 21 adjacent second end 19. In the preferred embodiment, the holes are positioned in two widthwise spaced apart parallel rows 23 and 24 adjacent the edges of metal band 15. The lengthwise spacing between holes 21 is selected to correspond to circumferences appropriate to various outside diameter pipes to be repaired.

Metal band 15 is held about pipe 13 by a pair of lugs, including a first lug 25 and a second lug 27. First lug 25 is an elongated bar that is fixedly connected to first end 17 of metal band 15. Second lug 27 is a bar that is not fixedly connected to metal band 15 but is positionable on the outside surface of metal band 15 adjacent selected holes 21.

First lug 25 and second lug 27 are connected and drawn together by a pair of bolts 29. Each bolt 29 passes through first lug 25 and second lug 27 and a selected hole 21. Bolt 29 is retained by a conventional nut 31. As nut 31 is tightened, lugs 25 and 27 are drawn toward each other to tighten band 15 about pipe 13.

First lug 25 includes a tab 33 that is positioned to engage the inside surface of metal band 15 adjacent second lug 27. Preferably, tab 33 is in the form of an elongated bar that is welded to or integral with first lug 25. As nut 31 and bolt 29 are tightened, metal band 15 is tightly clamped between tab 33 and second lug 27. The clamping action of tab 33 and second lug 27 contributes to the holding power of the clamp and prevents bolt 29 from ripping through the material between holes 21. Also, tab 33 is positioned radially outward of bolt 29 with respect to pipe 13, Thus, as lugs 25 and 27 are drawn together by bolt 29 and nut 31, their bottom sides 35 and 37, respectively, are rotated toward each other. The rotation of lugs 25 and 27 contributes to tightening metal band 15 on pipe 13.

Bolt 29 is made long enough so that it may be inserted through first lug 25, metal band 15, and second lug 27.

While metal band 15 is flexible, it is still moderately stiff when it is being worked with by hand. Accordingly, it is desirable that bolt 29 be long to facilitate hand assembly. However, bolt 29 is substantially longer than it needs to be in order to draw and hold together lugs 25 and 27. With the substantial extra length, a worker would be required to turn nut 31 over a considerable length before nut 31 starts to draw together lugs 25 and 27. Accordingly, in the preferred embodiment, bolt 29 includes an unthreaded end 39. Unthreaded end 39 serves as a pilot or guide during clamp assembly, and allows nut 31 to be slipped thereover and down to the threaded portion of nut 29 when lugs 25 and 27 are drawn together.

Pipe repair clamp 11 includes an elastomeric gasket sheet 41 which is wrapped about pipe 13 and held in place by metal band 15. Gasket sheet 41 provides the actual seal to repair the break or leak in pipe 13. Gasket sheet 41 includes a central portion 43 which is attached to metal band 15 and two free ends 45 and 47. The length of gasket sheet 43 between free ends 45 and 47 is sufficient for gasket sheet to encircle pipe 13 with end 45 overlapping end 47. The thickness of gasket sheet 41 preferably is reduced in tapering fashion between central portion 43 and free ends 45 and 47 so as to make the overlapping portions of gasket sheet 41 more uniform in thickness. A metal strip 49 is attached to the outer surface of gasket sheet 41 adjacent free end 45. Metal strip 49 is positioned to underline lugs 25 and 27. Thus, metal band 15 and metal strip 49 completely encircle gasket sheet 41 and urge it into sealing contact with pipe 13 by the action of lugs 25 and 27.

Since pipe repair clamp 11 is adapted for use with pipe of different diameters and, hence, different curvatures, metal strip 49 is initially flat and adapted to fit the curvature of the pipe. Since metal strip 49 is relatively short in length as compared to metal band 15, if metal strip 49 were of the same thickness as metal band 15, metal strip 49 would be very hard to bend, particularly by hand. Accordingly, referring to FIG. 7, in the preferred embodiment, metal strip 49 is preferably tapered toward its ends 51 and 53. The central portion of metal strip 49 between ends 51 and 53 is relatively thick and provides structural support to gasket sheet 41 in the gap formed between lugs 25 and 27. The tapering ends 51 and 53 allow metal strip 49 to be bend more easily to conform to the curvature of pipe 13.

Figure 6:
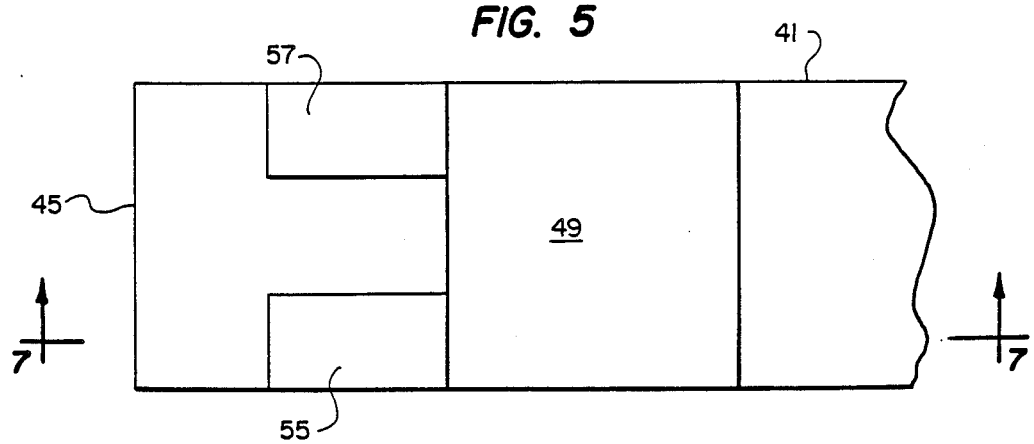
FIG. 6 is a partial top view of one end of the gasket sheet of the pipe repair clamp of the present invention.
Figure 7:
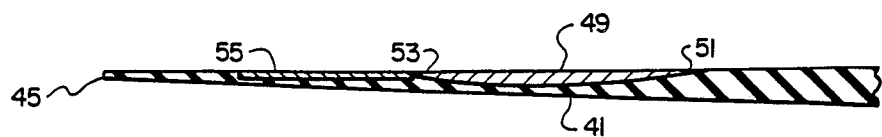
FIG. 7 is a sectional view taken along line 7—7 of FIG. 6.

Since gasket sheet 41 is attached to metal band 15, the position of free end 45 and metal strip 49 with respect to first end 17 of metal strip 15 is relatively fixed. Thus, metal strip 49 always underlies first lug 25. However, as may be visualized by reference to FIG. 2, the position of second end 19 of metal band 15 varies depending upon the diameter of pipe 13. For example, if pipe repair clamp 11 were used with the largest diameter pipe 13, bolt 29 would pass through the hole 21 closest to end 19 and the remaining holes 21 would be overlying gasket sheet 41. If holes 21 overlay the material of gasket sheet 41, such material would tend to extrude through the holes as band 15 is tightened. Accordingly, as best shown in FIGS. 6 and 7, gasket sheet 41 includes a pair of spaced apart lengthwise extending flexible metal strips 55 and 57 positioned between metal strip 49 and free end 45. Metal strips 55 and 57 are flexible so as to conform easily to the curvature of pipe 13 and are long enough so as always to underlie holes 21.

Figure 3:
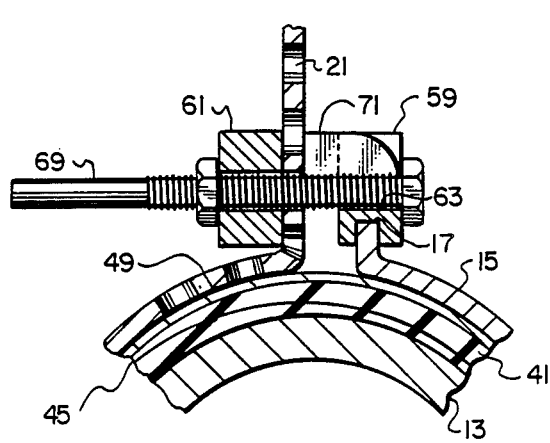
FIG. 3 is a partial sectional view of an alternative embodiment of the pipe repair clamp of the present invention.
Figure 4:
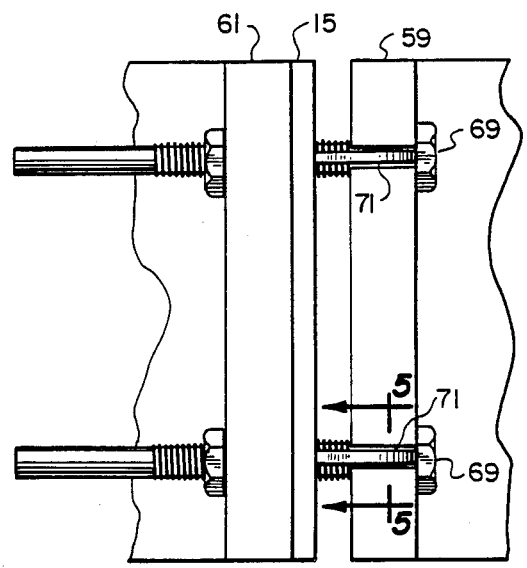
FIG. 4 is a top view of the embodiment of FIG. 3.
Figure 5:
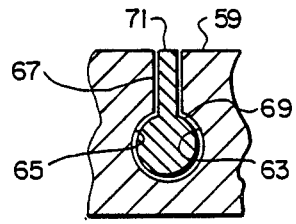
FIG. 5 is a sectional view taken along line 5—5 of FIG. 4.

Referring now to FIGS. 3–5, there is disclosed an alternative embodiment of the pipe repair clamp of the present invention. The alternative embodiment includes a flexible metal band 15 having a plurality of holes 21, which is adapted to hold a gasket sheet 41 about a pipe 13. A metal strip 49 is affixed to free end 45 of gasket sheet 41.

Metal band 15 of the embodiment of FIGS. 3–5 is held in position about gasket sheet 41 by a pair of lugs 59 and 61. First lug 59 is an elongated bar fixedly connected to first end 17 of metal band 15. First lug 59 includes a pair of spaced apart holes 63. As best shown in FIG. 5, each hole 63 is key hole shaped and includes a generally circular portion 65 and a noncircular portion 67. Second lug 61 is an elongated bar.

A pair of bolts 69 are provided for drawing together lugs 59 and 61. Each bolt 69 includes a plate-like tab 71 slidingly disposed in noncircular portion 67 of hole 63. Tab 71 is adapted to cooperate with second lug 61 to clamp metal band 15 therebetween as lugs 59 and 61 are drawn together by bolt 69.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after the benefit of this description of the invention.

What is claimed is:

1. A clamp for repairing a pipe, which comprises:
   a flexible metal band having first and second ends with a length therebetween sufficient to encircle the pipe, said metal band including an inside surface adapted to face said pipe and an oppositely facing outside surface, said band including a plurality of holes spaced apart lengthwise on said band adjacent said second end;
   an elastomeric gasket sheet having an outside surface facing said metal band and an oppositely facing inside surface, with a portion of said outside surface of said gasket sheet being attached to the inside surface of said metal band and said gasket sheet having two free ends with a length therebetween sufficient to encircle said pipe with one of said free ends overlapping the other of said free ends;
   a first lug connected to said first end of said metal band;
   a second lug positionable along said outside surface of said metal band adjacent one of said holes in said metal band with said second end of said metal band extending between said first and second lugs;
   bolt means passing through said one hole for drawing together said first and second lugs;
   a metal strip attached to the outside surface of one of said free ends of said gasket sheet, said metal strip underlying said first and second lugs when said metal band is wrapped around said pipe;
   and a tab connected to one of said lugs and disposed between said lug and said second end of said metal band for contacting said second end of said metal band when said first and second lugs are drawn together, said tab being also disposed radially outward of said bolt means to rotate said lugs inwardly toward each other when said lugs are drawn together.

2. The clamp as claimed in claim 1, wherein said metal strip underlies said holes when said metal band is wrapped around said pipe.

3. The clamp as claimed in claim 1, wherein said metal strip is tapered toward decreasing thickness at its ends.

4. The clamp as claimed in claim 1, wherein said bolt means includes a bolt having a head and an end with a length therebetween, wherein a portion of said length adjacent said bolt end is unthreaded.

5. The clamp as claimed in claim 1 including a second metal strip attached to said gasket sheet to underlie said holes.

6. A clamp for repairing a pipe, which comprises:
a flexible metal band having first and second ends with a length therebetween sufficient to encircle the pipe, said metal band including an inside surface adapted to face said pipe and an oppositely facing outside surface, said band including a plurality of holes spaced apart lengthwise on said band adjacent said second end;
an elastomeric gasket sheet having an outside surface facing said metal band and an oppositely facing inside surface, with a portion of said outside surface of said gasket sheet being attached to the inside surface of said metal band and said gasket sheet having two free ends with a length therebetween sufficient to encircle said pipe with one of said free ends overlapping the other of said free ends;
a first lug connected to said first end of said metal band;
a second lug positionable along said outside surface of said metal and adjacent one of said holes in said metal band with said second end of said metal band extending between said first and second lugs;
bolt means passing through said one hole for drawing together said first and second lugs;
a metal strip attached to the outside surface of one of said free ends of said gasket sheet, said metal strip underlying said first and second lugs when said metal band is wrapped around said pipe;
and a tab connected to said bolt means and disposed between said first lug and said second end of said metal band for contacting said second end of said metal band when said first and second lugs are drawn together, said tab being also disposed radially outward of said bolt means to rotate said lugs inwardly toward each other when said lugs are drawn together.

7. The clamp as claimed in claim 6, wherein said metal strip underlies said holes when said metal band is wrapped around said pipe.

8. The clamp as claimed in claim 6, wherein said metal strip is tapered toward decreasing thickness at its ends.

9. The clamp as claimed in claim 6, wherein said bolt means includes a bolt having a head and an end with a length therebetween, wherein a portion of said length adjacent said bolt end is unthreaded.

10. The clamp as claimed in claim 6 including a second metal strip attached to said gasket sheet to underly said holes.

11. The clamp as claimed in claim 6 wherein said first lug includes a keyhole shaped hole having a circular portion and a non-circular portion, with said tab being slidingly disposed in said non-circular portion of said keyhole shaped hole.

* * * * *